(12) United States Patent
Kim

(10) Patent No.: US 7,836,444 B2
(45) Date of Patent: Nov. 16, 2010

(54) MOBILE COMMUNICATION TERMINAL HAVING EMBEDDED SYSTEM FOR SOFTWARE DOWNLOAD AND METHOD FOR SOFTWARE DOWNLOAD

(75) Inventor: Dong-Hyeon Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1497 days.

(21) Appl. No.: 10/918,922

(22) Filed: Aug. 16, 2004

(65) Prior Publication Data

US 2005/0097544 A1 May 5, 2005

(30) Foreign Application Priority Data

Oct. 31, 2003 (KR) ...................... 10-2003-0076826

(51) Int. Cl.
*G06F 9/44* (2006.01)
*G06F 9/445* (2006.01)
*G06F 15/177* (2006.01)
*H04M 3/00* (2006.01)

(52) U.S. Cl. ....................... 717/173; 717/178; 709/221; 455/418

(58) Field of Classification Search ......... 717/168–173; 713/1–2; 709/220–222; 455/418–420
See application file for complete search history.

(56) References Cited

U.S. PATENT DOCUMENTS

| | | | |
|---|---|---|---|
| 5,210,854 A * | 5/1993 | Beaverton et al. ........... | 717/174 |
| 5,794,052 A * | 8/1998 | Harding ...................... | 717/178 |
| 6,237,091 B1 * | 5/2001 | Firooz et al. .................. | 713/1 |
| 6,282,643 B1 * | 8/2001 | Cromer et al. ................ | 713/2 |
| 6,470,496 B1 * | 10/2002 | Kato et al. ................... | 717/173 |
| 6,545,554 B1 * | 4/2003 | Rozenblit et al. ........ | 331/117 R |
| 6,591,376 B1 | 7/2003 | VanRooven et al. | |
| 6,658,435 B1 * | 12/2003 | McCall ........................ | 717/174 |
| 6,928,108 B2 * | 8/2005 | Nelson et al. ................ | 375/222 |
| 2002/0073304 A1 * | 6/2002 | Marsh et al. ................... | 713/1 |
| 2002/0124064 A1 * | 9/2002 | Epstein et al. .............. | 717/171 |
| 2003/0028628 A1 * | 2/2003 | Irwin et al. .................. | 709/222 |
| 2003/0084229 A1 | 5/2003 | Ho | |
| 2004/0040020 A1 * | 2/2004 | Yang .......................... | 717/168 |
| 2004/0205779 A1 * | 10/2004 | Almeida et al. .............. | 719/321 |
| 2006/0258344 A1 * | 11/2006 | Chen .......................... | 455/419 |

FOREIGN PATENT DOCUMENTS

EP 1052571 11/2000

* cited by examiner

*Primary Examiner*—Wei Y Zhen
*Assistant Examiner*—Ryan D Coyer
(74) *Attorney, Agent, or Firm*—The Farrell Law Firm, LLP

(57) ABSTRACT

Disclosed is a mobile communication terminal having an embedded system for software download and a method for software download. The embedded system comprises a first memory including a code area for storing operation code of the mobile communication terminal, a data area for storing user data, and an area for storing a file system for managing the data area, a second memory for storing the least amount of code required for software download when software is upgraded, the operation code and the file system, and a control unit for booting the embedded system on the basis of the second memory when the software is upgraded, and then storing a downloaded current version of the software module in the data area of the first memory using the file system.

8 Claims, 3 Drawing Sheets

MOBILE COMMUNICATION TERMINAL HAVING EMBEDDED SYSTEM FOR SOFTWARE DOWNLOAD AND METHOD FOR SOFTWARE DOWNLOAD

PRIORITY

This application claims priority to an application entitled "MOBILE COMMUNICATION TERMINAL HAVING EMBEDDED SYSTEM FOR SOFTWARE DOWNLOAD AND METHOD FOR SOFTWARE DOWNLOAD", filed in the Korean Intellectual Property Office on Oct. 31, 2003 and assigned Serial No. 2003-76826, the contents of which are hereby incorporated by reference.

BACKGROUND OF THE INVENTION

1. Field of the Invention

The present invention relates to a mobile communication terminal, and more particularly to an embedded system and a method for software download in a mobile communication terminal having.

2. Description of the Related Art

An embedded system is installed within consumer products, for example, within most devices having a microprocessor or a micro-controller. Such an embedded system is used to control, monitor, or assist these devices. In addition, this embedded system is also being used in mobile communication terminals.

Currently, mobile communication terminals are marketed with a variety of functions in compliance with user demand. On the other hand, with enlargement of functionality of mobile communication terminals and services of mobile communication service providers, a need to upgrade software loaded in the mobile communication terminals has increased. Accordingly, at present, software loaded in the mobile communication terminals is modularized and, when a software upgrade is required, a current version of the module encapsulating the required upgrade can be provided to the mobile communication terminals through a certain upgrade apparatus, such as a personal computer.

FIG. 1 is a block diagram showing a mobile communication terminal having a conventional embedded system 100. As shown in FIG. 1, the embedded system 100 generally includes a radio frequency unit 110, a control unit 120, a flash memory 130, and a RAM (Random Access Memory) 140. The flash memory 130 includes an area 132 in which operation code of the control unit 120 and user data or parameters are stored. In addition, the flash memory 130 includes an upgrade buffer area 136 in which a current version of downloaded software module is temporally stored. For upgrade of the software module, the embedded system 100 can receive the current version of the software module wirelessly from a base station 10 in a mobile communication system. Alternatively, the embedded system 100 can receive the current version of the software module from an upgrade apparatus 20 such as a personal computer. Here, the embedded system 100 can be connected to the upgrade apparatus 20 physically or by wireless means of a local area network, e.g., a radio communication network. When the software module is upgraded in the embedded system 100, as shown in FIG. 1, code for the software download operation, including at least code for booting and code for software download, are loaded into a code load area 142 of the RAM 140. Then, after rebooting on a RAM basis, the embedded system 100 stores a current version of the software module in the upgrade buffer area 136 with a certain size.

After this, the embedded system 100 stores or overwrites the current version of the software module downloaded into the upgrade buffer area 136, in a corresponding area in the flash memory 130 in which an old version of the software module is stored.

As mentioned above, the conventional embedded system requires a separate storage area for storing data downloaded for software upgrade. It is apparent that such a storage area has to have a capacity higher than that of a software module with the highest capacity of a plurality of software modules stored in the embedded system. This results in increased power consumption and production costs in the embedded system of the mobile communication terminal having a limit to an install area of a memory device.

SUMMARY OF THE INVENTION

Therefore, the present invention has been made in view of the above problem, and it is an object of the present invention to provide a mobile communication terminal having an embedded system capable of downloading software without requiring a separate storage area for software upgrade and a method for software download.

In accordance with an aspect of the present invention, the above and other objects can be accomplished by the provision of a mobile communication terminal having an embedded system for software download, wherein the embedded system comprises: a first memory including a code area for storing operation code of the mobile communication terminal, a data area for storing user data, and an area for storing a file system for managing the data area; a second memory for storing the least amount of code required for software download when software is upgraded, the operation code, and the file system; and a control unit for booting the embedded system on the basis of the second memory when the software is upgraded and then storing a downloaded current version of the software module in the data area of the first memory using the file system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a preferred embodiment of the present invention will be described in detail with reference to the accompanying drawings. In the following description, a detailed description of known functions and configurations incorporated herein will be omitted when it may make the subject matter of the present invention rather unclear.

Figure 1:
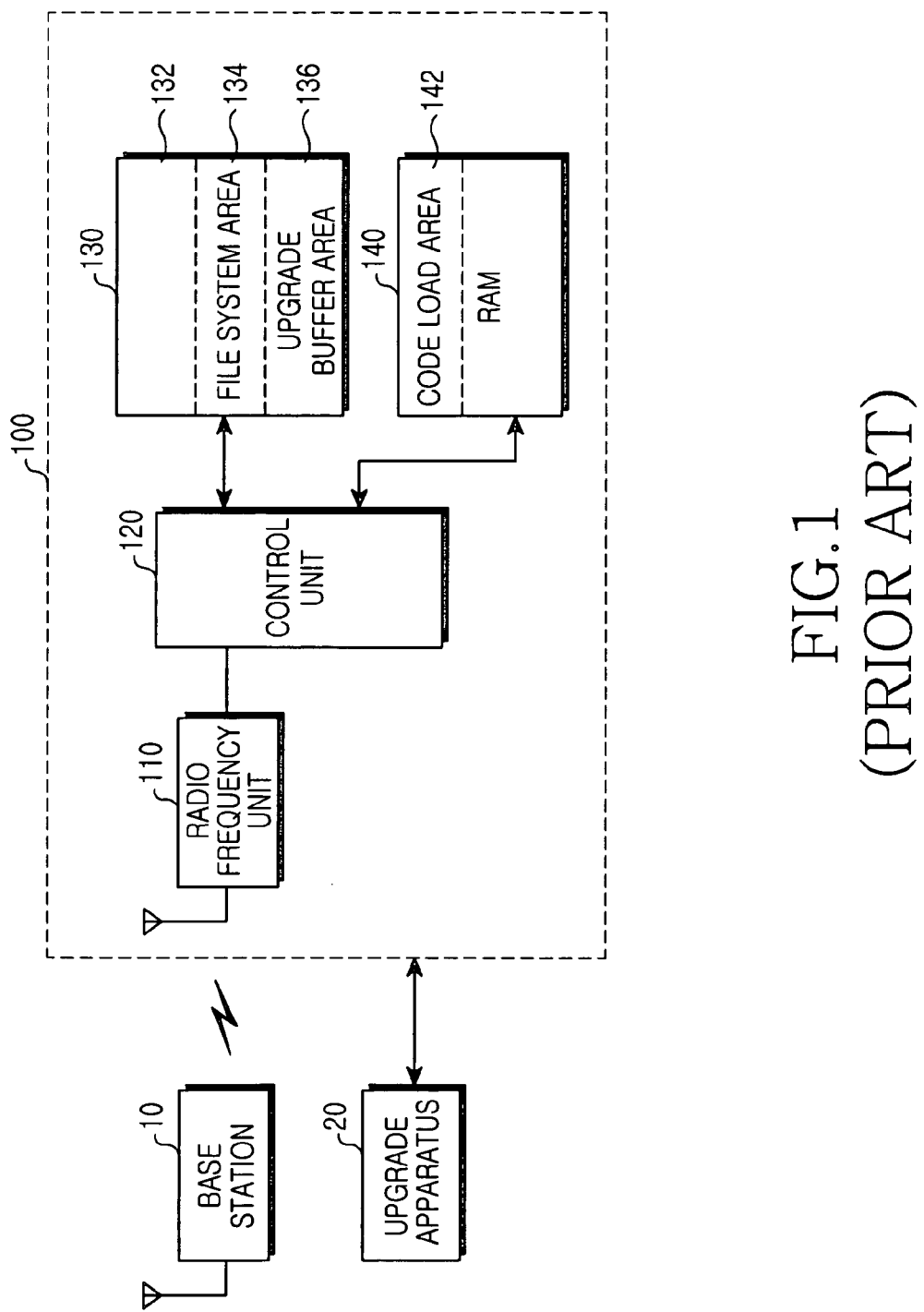
FIG. 1 is a block diagram showing a conventional embedded system in a mobile communication terminal.
Figure 2:
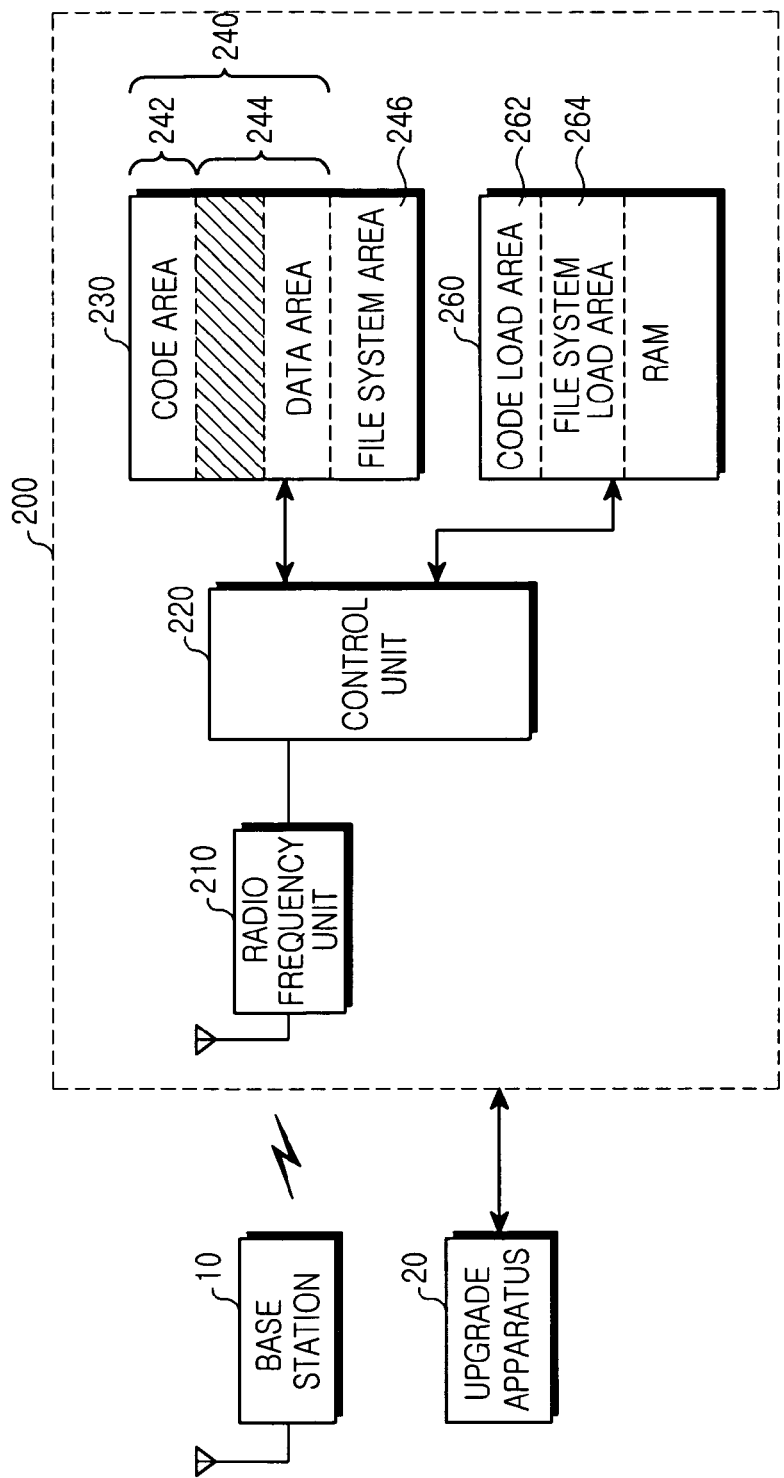
FIG. 2 is a block diagram showing an embedded system in a mobile communication terminal in accordance with an embodiment of the present invention.

FIG. 2 is a block diagram showing a mobile communication terminal having an embedded system 200 in accordance with an embodiment of the present invention. Referring to FIG. 2, the embedded system 200 in accordance with the present invention includes a radio frequency unit 210, a control unit 220, a flash memory 230, and random access memory (RAM) 260. For upgrade of the software module, as described earlier, the embedded system 200 can wirelessly receive the current version of software module from a mobile communication system base station 10 or by wire from an upgrade apparatus 20 such as a personal computer. The embedded system 200 can be connected to the upgrade apparatus 20 physically or wirelessly by means of a local area network, e.g., a radio communication system. The flash memory 230 includes a code area 242 in which operation code of the control unit 220 are stored and a data area 244 in which user data or parameters are stored. The operation code stored in the code area 242 includes a user interface code, a radio frequency (RF) driver code for radio communication, a system driving code for system driving, a sound code, etc. Also, the flash memory 230 includes an area 246 in which a file system for managing the data area in accordance with the present invention is stored. The file system manages each of a plurality of files stored in the data area 244 and has information on storage location and a size of each file. The control unit 220 can access the data area 244 using the file system. This file system is loaded into the RAM 260 in a software download mode in accordance with the present invention. Accordingly, the control unit 220 is able to manage the data area 244 even in the software download mode.

In general, as shown in FIG. 2, data is not stored in the whole of the data area 244. Namely, a writable (permanent) data area of the whole data area 244 exists although it is not specified. An area of the whole data area 244 in which data is stored is an obliquely lined area in area 244 of FIG. 2. When software is upgraded, the control unit 220 stores the downloaded current version of the software module in an empty area in which data is not stored, of the data area by using the file system described above.

Now, the operation of the embedded system will be described in detail with reference to FIG. 2. When the software module is upgraded, as shown in FIG. 2, the control unit 220 of the embedded system 200 loads the code for software download operation, including at least the code for booting and the code for software download, into a code load area 262 of the RAM 260. The control unit 220 loads the file system, used for managing the data area 244, into the file system load area 264. After rebooting the embedded system on a RAM basis, the control unit 220 uses the file system to copy an old version of a software module being upgraded, which is stored in the code area 242 of the flash memory 230, into an empty area of the data area 244 in which data is not stored. Subsequently, the control unit 220 marks the old version of the software module stored in the data area 244 to indicate that the module is an old version of the software.

In addition, the control unit 220 stores a current version of the software module to be downloaded into the empty area of the data area 244 in which data is not stored, by using the file system. Subsequently, the control unit 220 marks the current version of software module stored in the data area 244 to indicate that the module is a current version of the software. Then, the control unit 220 stores or writes the current version of the software module into the area of the code area 244 of the flash memory 230, in which the old version of the software module is stored. After completing the overwriting of the current version of the software module into the code area 242, the control unit 220 boots the embedded system 200 using the flash memory 230. Then, the control unit 220 deletes the code for software download operation, including at least the code for booting and the code for software download, which are stored in the RAM 260. Finally, the control unit 220 terminates the software download procedure by deleting the old version and the current version of the software module stored in the data area 244 of the flash memory 230.

Figure 3:
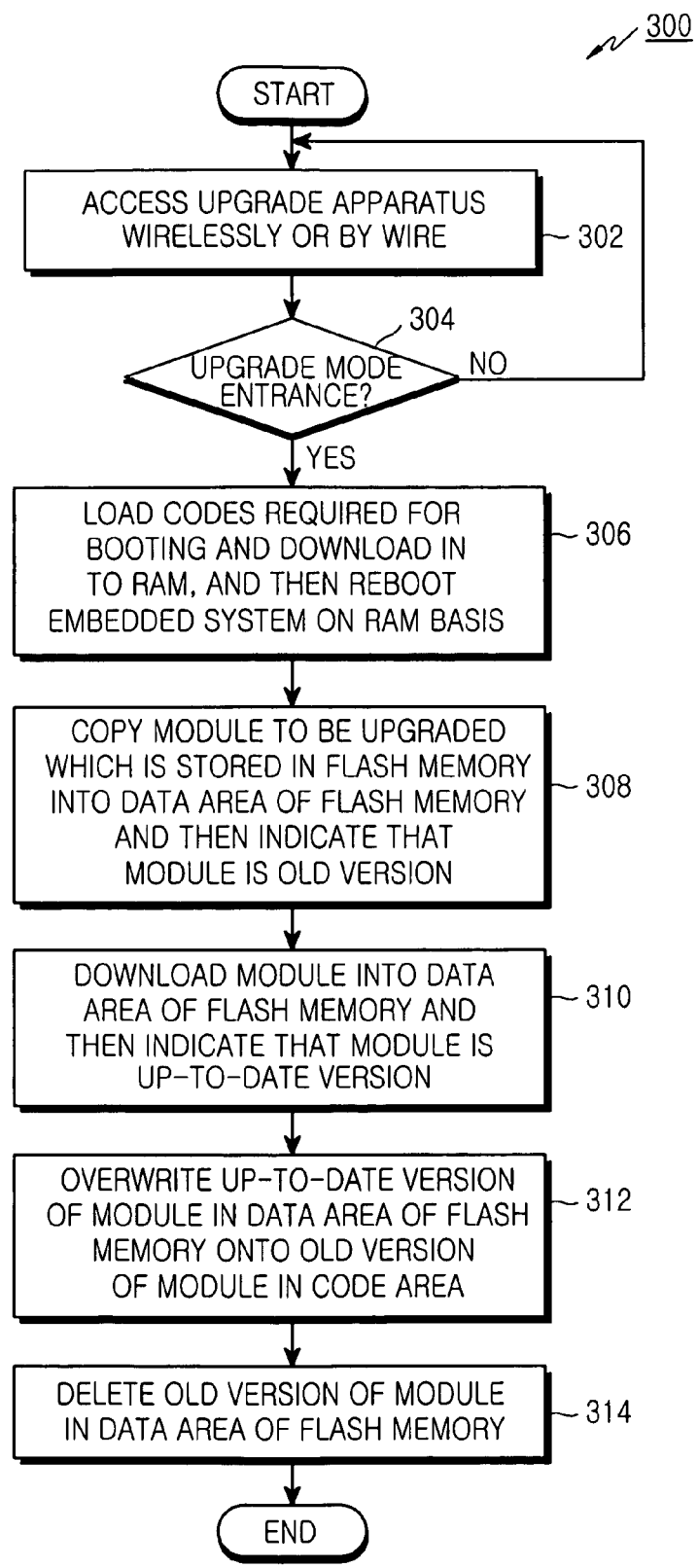
FIG. 3 is a flowchart illustrating a method for software download in accordance with an embodiment of the present invention.

Hereinafter, the software download procedure in the embedded system will be described with reference to FIG. 3, which is a flow chart illustrating a method for software download in accordance with an embodiment of the present invention. Referring to FIG. 3, when the software module is upgraded, the control unit 220 of the embedded system 200 accesses the upgrade apparatus 20 wirelessly or by wire for software upgrade in step 302. The upgrade apparatus 20 has a current version of data of the software module to be upgraded and provides a current version of the software module to the embedded system 200 wirelessly or by wire in compliance with an upgrade request from the embedded system 200. The upgrade apparatus 20 can be connected to the embedded system 200 through a base station or by means of a network, e.g., a short-range radio communication network.

Next, in step 304, the control unit 220 proceeds to check whether the embedded system. 200 enters into an upgrade mode. A user or a service provider can cause the embedded system 200 to enter into the upgrade mode. After the embedded system 200 has entered into the upgrade mode, in step 306 the control unit 220 proceeds to load the code for the software download operation, including at least the code for booting and the code for software download, into the code load area 262 of the RAM 260. In addition, the control unit 220 loads the file system for managing the data area 244 into the file system load area 264, and then reboots the embedded system 200 on a RAM basis. Subsequently, in step 308, the control unit 220 copies an old version of the software module to be upgraded, which is stored in the code area 242 of the flash memory 230, into an empty area in which data is not stored, of the data area 244 by using the file system. At this time, the control unit 220 marks the old version of the software module stored in the data area 244 to indicate that the module is an old version. The reason for copying the old version of the software module into the data area 244 is to protect the old version of the software module in the existing code area 242 in the case of, for example, a power failure during the software module update.

Subsequently, in step 310, the control unit 220 stores a current version of the software module to be downloaded into the empty area in which data is not stored, of the data area 244 by using the file system. At this time, the control unit 220 marks the current version of software module stored in the data area 244 to indicate that the module is a current version. Then, in step 312, the control unit 220 stores or writes the current version of the software module into the area of the code area 244 of the flash memory 230 in which the old version of the software module is stored. At this time, if it is impossible to recover the old version of software module in the code area 242 and the current version of software module in the data area 244 due to certain system errors, the old version of software module in the data area 244 is again stored in the code area 242. In this way, the embedded system of the present invention prepares against unexpected errors and failures.

After completing the writing of the current version of software module into the code area 242, the control unit 220 boots the embedded system 200 on the basis of the flash memory 230. Then, in step 314, the control unit 220 deletes the code for the software download operation, including at least the code for booting and the code for software download, which are stored in the RAM 260. Finally, the control unit 220 terminates the software download procedure by deleting the old version and the current version of the software module stored in the data area 244 of the flash memory 230.

On the other hand, although the embedded system has been described to have the flash memory and the RAM in the embodiment of the present invention, it is apparent to those skilled in the art that the present invention is applicable to nonvolatile or volatile memories other than the flash memory and the RAM.

As apparent from the above description, when the code for a software download operation, including at least the code for booting and the code for software download, is loaded into a volatile memory for software upgrade, the embedded system of the present invention loads a file system for managing a data area of a volatile memory into the volatile memory. Accordingly, the embedded system stores a current version of software module into a writable (permanent) data area of the nonvolatile memory by using the file system, eliminating a need of a separate storage area in which downloaded data is stored.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A mobile communication terminal having an embedded system for software download, wherein the embedded system comprises:

a first memory including a code area for storing operation code of the mobile communication terminal, a data area for storing user data is stored, and an area for storing a file system for managing the data area;

a second memory for storing code required for a software download when software is upgraded, the operation code, and the file system; and a control unit for, when the software is upgraded, booting the embedded system on the basis of the second memory while the second memory includes the code required for the software download, the operation code, and the file system and then storing a downloaded current version of the software module in the data area of the first memory using the file system, wherein the control unit stores an old version of the software module to be upgraded, which was stored in the code area of the first memory, into the data area using the file system, and then marks the old version of the software module to indicate that the module is an old version, and wherein, upon a completion of upgrading the software, the control unit deletes both the old version of the software module and the current version of the software module from the data area of the first memory; and wherein the first memory is a nonvolatile memory, and wherein the second memory is a volatile memory.

2. The mobile communication terminal as set forth in claim 1, wherein the nonvolatile memory is a flash memory.

3. The mobile communication terminal as set forth in claim 1, wherein the volatile memory is a Random Access Memory (RAM).

4. The mobile communication terminal as set forth in claim 1, wherein the control unit overwrites the current version of software module stored in the data area onto the old version of the software module stored in the code area of the first memory, and then reboots the embedded system on the basis of the first memory.

5. A method for downloading software in a mobile communication terminal having an embedded system including a first memory and a second memory, the method comprising the steps of:

a) in the first memory, providing a code area for storing operation code of the mobile communication terminal, a data area for storing user data, and an area for storing a file system for managing the data area;

b) in the second memory, storing code required for a software download when software is upgraded, the operation code, and the file system;

c) booting the embedded system on the basis of the second memory while the second memory includes the code required for the software download, the operation code, and the file system, and then storing a downloaded current version of the software module in the data area of the first memory using the file system; and d) using the file system for storing an old version of the software module to be upgraded, which was stored in the code area of the first memory in the data area, and then marking the old version of the software module to indicate that the module is an old version, wherein, upon a completion of upgrading the software, the mobile communication terminal deletes both the old version of the software module and the current version of the software module from the data area of the first memory; and wherein the first memory is a nonvolatile memory, and wherein the second memory is a volatile memory.

6. The method as set forth in claim 5, wherein the nonvolatile memory is a flash memory.

7. The method as set forth in claim 5, wherein the volatile memory is a Random Access Memory (RAM).

8. The method as set forth in claim 5, further comprising: e) writing the current version of the software module stored in the data area onto the old version of the software module stored in the code area of the first memory and then rebooting the embedded system on the basis of the first memory.

* * * * *